(12) United States Patent
Wang et al.

(10) Patent No.: US 12,516,315 B2
(45) Date of Patent: Jan. 6, 2026

(54) GENETICALLY ENGINEERED IMMUNE EFFECTOR CELLS COMPRISING R-PHYCOERYTHRIN-TARGETING RECEPTOR CONJUGATED CHIMERIC ANTIGEN RECEPTOR

(71) Applicant: The Regents of the University of California, Oakland, CA (US)

(72) Inventors: Yingxiao Wang, San Diego, CA (US); Praopim Limsakul, San Diego, CA (US); Yiqian Wu, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 1026 days.

(21) Appl. No.: 17/627,193

(22) PCT Filed: Jul. 16, 2020

(86) PCT No.: PCT/US2020/042345
§ 371 (c)(1),
(2) Date: Jan. 14, 2022

(87) PCT Pub. No.: WO2021/011781
PCT Pub. Date: Jan. 21, 2021

(65) Prior Publication Data
US 2022/0354891 A1    Nov. 10, 2022

Related U.S. Application Data

(60) Provisional application No. 62/874,744, filed on Jul. 16, 2019.

(51) Int. Cl.
| | | |
|---|---|---|
| *A61K 35/17* | (2025.01) |
| *A61K 38/19* | (2006.01) |
| *A61K 40/11* | (2025.01) |
| *A61K 40/31* | (2025.01) |
| *A61K 40/42* | (2025.01) |
| *A61K 47/68* | (2017.01) |
| *C07K 16/44* | (2006.01) |
| *C12N 15/10* | (2006.01) |

(52) U.S. Cl.
CPC ........ *C12N 15/1037* (2013.01); *A61K 38/195* (2013.01); *A61K 40/11* (2025.01); *A61K 40/31* (2025.01); *A61K 40/4202* (2025.01); *A61K 40/4205* (2025.01); *A61K 40/4211* (2025.01); *A61K 40/4221* (2025.01); *A61K 40/4257* (2025.01); *A61K 40/4276* (2025.01); *A61K 47/6803* (2017.08); *C07K 16/44* (2013.01); *A61K 2239/31* (2023.05); *A61K 2239/48* (2023.05)

(58) Field of Classification Search
CPC .............. C12N 15/1037; A61K 38/195; A61K 40/11; A61K 40/31; A61K 40/4202; A61K 40/4205; A61K 47/6803; A61K 2239/31

See application file for complete search history.

(56) References Cited

U.S. PATENT DOCUMENTS

| | | |
|---|---|---|
| 2013/0287752 A1 | 10/2013 | Davila et al. |
| 2014/0234348 A1 | 8/2014 | Scholler et al. |

OTHER PUBLICATIONS

Ficner, R. and Huber, R., 1993. Refined crystal structure of phycoerythrin from Porphyridium cruentum at 0.23-nm resolution and localization of the γ subunit. European Journal of Biochemistry, 218(1), pp. 103-106. (Year: 1993).*

* cited by examiner

*Primary Examiner* — Jeremy C Flinders
*Assistant Examiner* — Masudur Rahman
(74) *Attorney, Agent, or Firm* — Gregory P. Einhorn; Greer, Burns & Crain, Ltd.

(57) ABSTRACT

In alternative embodiments, provided are compositions, including products of manufacture and kits, and methods, for engineering immune effector cells, e.g., T cells, NK cells, monocytes and/or macrophages to recognize and destroy a desired target cell, which can be a cancer cell, a dysfunctional cell, or an infected cell.

10 Claims, 11 Drawing Sheets

Specification includes a Sequence Listing.

GENETICALLY ENGINEERED IMMUNE EFFECTOR CELLS COMPRISING R-PHYCOERYTHRIN-TARGETING RECEPTOR CONJUGATED CHIMERIC ANTIGEN RECEPTOR

RELATED APPLICATIONS

This application is a national phase application claiming benefit of priority under 35 U.S.C. § 371 to Patent Convention Treaty (PCT) International Application serial number PCT/US2020/042345, filed Jul. 16, 2020, which claims the benefit of priority to U.S. Provisional Application Ser. No. (USSN) 62/874,744, filed Jul. 16, 2019, now expired. The aforementioned applications are expressly incorporated herein by reference in their entirety and for all purposes.

STATEMENT AS TO FEDERALLY SPONSORED RESEARCH

This invention was made with government support under HL098472, HL109142, and HL121365 awarded by the National Institutes of Health (NIH) and under CBET1344298 and DMS1361421 awarded by the National Science Foundation. The government has certain rights in the invention.

TECHNICAL FIELD

This invention generally relates to cancer immunology and molecular biology. In alternative embodiments, provided are compositions, including products of manufacture and kits, and methods, for engineering immune effector cells such as T cells, natural killer (NK) cells, monocytes and/or macrophages to recognize and destroy a desired target cell, which can be a cancer cell.

BACKGROUND

Chimeric Antigen Receptor (CAR) T cell is a genetically engineered T cell with a synthetic CAR. The CAR T cell therapy has become a promising therapeutic approach for cancer treatment because it can directly destroy cancer cells and it is highly effective against blood-based malignancies.

SUMMARY

In alternative embodiments, provided are genetically engineered immune effector cells comprising a cell surface expressed: phycoerythrin-targeting heterologous antibody or monobody; or, R-Phycoerythrin-targeting (PE-targeting) receptor (PEbody),
  wherein the phycoerythrin-targeting heterologous antibody or monobody, and the R-Phycoerythrin-targeting (PE-targeting) receptor (PEbody), are capable of specifically binding to a R-Phycoerythrin, wherein the phycoerythrin or R-Phycoerythrin is conjugated to an antigen binding molecule, wherein optionally the antigen is cancer or a tumor antigen, or a viral antigen,
  wherein optionally the genetically engineered immune effector cell is a Chimeric Antigen Receptor (CAR)-expressing T cell, a progenitor T cell a Natural Killer (NK) cell, a monocyte and/or a macrophage,
  and optionally the genetically engineered immune effector cell is a human cell, optionally a human T cell, a human progenitor T cell, a human NK cell, a human monocyte and/or a human macrophage.

In alternative embodiments, provided are methods for targeting an immune effector cell to a target cell in an individual, comprising:
  administering to the individual a genetically engineered immune effector cell as provided herein, and a target-targeting R-Phycoerythrin-conjugated (PE-conjugated) antibody or monobody, or PE-conjugated antigen binding molecule,
  wherein optionally the genetically engineered immune effector cell and the target-targeting R-Phycoerythrin-conjugated (PE-conjugated) antibody or monobody or PE-conjugated antigen binding molecule, are administered in the same formulation, or are administered separately, or the genetically engineered immune effector cell is administered before the target-targeting R-Phycoerythrin-conjugated (PE-conjugated) antibody or monobody or PE-conjugated antigen binding molecule, or the genetically engineered immune effector cell is administered after the target-targeting R-Phycoerythrin-conjugated (PE-conjugated) antibody or monobody or PE-conjugated antigen binding molecule,
  and optionally the target-targeting R-Phycoerythrin-conjugated (PE-conjugated) antibody or monobody or PE-conjugated antigen binding molecule, is capable of targeting and binding to a cancer or tumor antigen, or a cancer- or tumor-antigen expressing cell, and optionally the target is a bacterial or a viral antigen and the target-targeting R-Phycoerythrin-conjugated (PE-conjugated) antibody or monobody or PE-conjugated antigen binding molecule, is capable of targeting and binding to a viral or bacterial antigen expressing cell.

In alternative embodiments of methods as provided herein:
  the target-targeting R-Phycoerythrin-conjugated (PE-conjugated) antibody or monobody, or the PE conjugated antigen binding molecule, is capable of targeting and binding to a cancer or tumor antigen or a cancer or tumor cell, and the method comprises treating or ameliorating a cancer or a tumor, or the method comprises killing of cancer or tumor cells in the individual in need thereof;
  the target-targeting R-Phycoerythrin-conjugated (PE-conjugated) antibody or monobody, or the PE conjugated antigen binding molecule, is capable of targeting and binding to a virus or a bacterial antigen expressed on a cell, and the method comprises treating or ameliorating an infection caused by the virus or bacterial, or the method comprises killing of cells expressing the virus or bacterial antigen in the individual in need thereof, and optionally the virus antigen is a coronavirus antigen, optionally a COVID-19 antigen, a hepatitis antigen, or an immune-deficiency virus (HIV) antigen, optionally a HIV-1, antigen;
  a genetically engineered immune effector cell as provided herein, and the target-targeting R-Phycoerythrin-conjugated (PE-conjugated) antibody or monobody, or the PE conjugated antigen binding molecule, are administered intravenously (IV) or intra-arterially (optionally as a hepatic arterial infusion), or are administered locally in or approximate to the location of a tumor or cancer, or are administered intratumorally;
  the amount of the genetically engineered immune effector cells administered to the individual in need thereof comprises:
  (a) a genetically engineered immune effector cell (effector) to target tumor or cancer cell (E:T) ratio estimated at about 1:1, or between about 1:1 to 10:1, if the genetically engineered immune effector cells are administered in situ, or locally, or approximate to a cancer, tumor or infection site, wherein administer approximate to the cancer, tumor or infection site comprises administering within the same tissue or organ where the cancer, tumor or infection site is found, or within between about 1 cm to 10 cm of the cancer, tumor or infection site;

(b) an E:T ratio of about 10:1, or between about 5:1 and 50:1, if the genetically engineered T cells are administered intravenously (IV) or intrathecally;

(c) between about 1 to 10 million, or between about 2 and 8 million, genetically engineered immune effector cells are administered if the genetically engineered immune effector cells are administered in situ, or locally, or approximate to the tumor site or intratumorally; or (d) between about 10 to 100 million genetically engineered immune effector cells if the genetically engineered immune effector cells are administered intravenously (IV);

the R-Phycoerythrin-targeting (PE-targeting) receptor (PEbody) has an amino acid sequence comprising:

```
                                            (SEQ ID NO: 5)
AVSDVPRKLEVVAATPTSLLISWDAPFINFKYYRITYGETGGNSPV

QEFTVPGSKSTATISGLKPGVDYTITVYAVTWPWWYSKPISINYRTS.
``` the genetically engineered immune effector cells are co-administered with at least one immune function-enhancing factor, optionally a T cell function-enhancing factor, wherein optionally the T cell function-enhancing factor comprises CCL19.

In alternative embodiments, provide are kits comprising a genetically engineered immune effector cell as provided herein; or kits comprising a genetically engineered immune effector cell as provided herein, and a target-targeting R-Phycoerythrin-conjugated (PE-conjugated) antibody or monobody or PE-conjugated antigen binding molecule, wherein optionally the R-Phycoerythrin-targeting (PE-targeting) receptor (PEbody) has an amino acid sequence comprising SEQ ID NO:5.

In alternative embodiments, provided are uses of a genetically engineered immune effector cell comprising a cell surface expressed: heterologous antibody or monobody; or, R-Phycoerythrin-targeting (PE-targeting) receptor (PEbody), or a genetically engineered immune effector cell as provided herein, wherein the heterologous antibody or monobody, and the R-Phycoerythrin-targeting (PE-targeting) receptor (PEbody), are capable of specifically binding to R-Phycoerythrin, wherein optionally the genetically engineered immune effector cell is a Chimeric Antigen Receptor (CAR) expressing T cell, T progenitor cell, NK cell, monocyte and/or macrophage, and optionally the genetically engineered immune effector cell is a human immune effector cell, a human T cell, a human primary T cell, a human NK cell, a human monocyte and/or a human macrophage, for: for targeting an immune effector cell to a target cell in an individual, or killing of cancer or tumor cells, or bacterial or viral infected cells, in the individual in need thereof.

The details of one or more exemplary embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

DESCRIPTION OF DRAWINGS

The drawings set forth herein are illustrative of exemplary embodiments provided herein and are not meant to limit the scope of the invention as encompassed by the claims.

Figures are described in detail herein.

FIG. 2A-C illustrates the engineering of the PEbody, an R-Phycoerythrin (PE) binder:

FIG. 2C illustrates PE binding to the PEbody but not G9: Left image graphically illustrates the flow cytometry histogram result showing the distribution of PE intensity on the yeast cell surface displaying the G9 or PEbody; the population with black color refers to cells that cannot bind to PE and orange color represents those that bind to PE; the right image illustrates the imaging results from the fluorescence microscopy showing PE intensity and the differential interference contrast (DIC) images of HEK293 cells expressing the G9 or PEbody. Scale bar: 20 μm;

as described in detail in Example 1, below.

FIG. 3A-C illustrates the design and characterization of the PEbody CAR system:

as described in detail in Example 1, below.

FIG. 6A-B illustrates the PEbody CAR system targeting different antigens on solid cancers:

as described in detail in Example 1, below.

FIG. 7A-C illustrate in vivo experiments employing exemplary PEbody CAR T cells for the tumor suppression in xenograft mouse models:

FIG. 7B illustrates how the antibody continued to be dosed every 2 days at 0.2 ug for 6 days to keep the exemplary engineered T cells and tumors engaged;

FIG. 7C graphically illustrates (as normalized tumor size, versus days post tumor target (a B cell precursor leukemia cell line) injection) that the exemplary PEbody CAR T cells as provided herein suppressed the target tumor growth, guided by the PE-conjugated antibody recognizing CD19;

as described in detail in Example 1, below.

Like reference symbols in the various drawings indicate like elements.

DETAILED DESCRIPTION

In alternative embodiments, provided are compositions, including products of manufacture and kits, and methods, for engineering immune effector cells such as T cells, natural killer (NK) cells, monocytes and/or macrophages to recognize, and optionally destroy, a desired target cell, which can be a cancer cell or a tumor cell.

To increase the ability of Chimeric Antigen Receptor (CAR) T cells, including other immune effector cells such as T progenitor cells, natural killer (NK) cells, monocytes and/or macrophages to target different antigens, we developed a universal receptor for CAR, called PEbody CAR, to target different antigens without re-engineering the immune effector cell (for example, the T cell, NK cell, monocyte and/or macrophage), where "PE" is R-Phycoerythrin. The PEbody CAR comprises two components: 1) a R-Phycoerythrin-targeting (PE-targeting) receptor (PEbody) expressed on T cells (the CAR T cell); and, 2) a target-targeting (for example, a cancer cell or tumor-targeting, or viral antigen targeting) R-Phycoerythrin-conjugated (PE-conjugated) antibody, or monobody (a synthetic binding protein constructed using a fibronectin type III domain (FN3) as a molecular scaffold), or equivalent, including any antigen binding molecule, wherein the antigen is express on the target cell, for example, the antigen is express on a cancer or a tumor cell, or a viral antigen-expressing cells, to be targeted. The two-component receptor system allows this CAR design to switch targets without having to re-engineer the immune effector cells, e.g., T cells, NK cells, monocytes and/or macrophages. By changing PE-conjugated antibodies or PE-conjugated antigen binding molecules, the PEbody-expressing CAR the immune effector cells can target different antigens expressed on different target cells, for example, different cancer cells, tumor cells or dysfunctional cells or viral infected cells and the like, wherein the CAR the immune effector cells (e.g., T cells) can then directly destroy the antigen expressing cells.

Thus, in alternative embodiments, provided are genetically engineered the immune effector cells such as T cells, NK cells, monocytes and/or macrophages expressing on their surface a synthetic, heterologous a R-Phycoerythrin-targeting (PE-targeting) receptor (PEbody) as provided herein, which can bind to an R-Phycoerythrin-conjugated (PE-conjugated) antibody or antigen binding molecule. Also provided are systems and methods comprising these PEbody-expressing genetically engineered the immune effector cells and target-targeting (e.g., a tumor-targeting) R-Phycoerythrin-conjugated (PE-conjugated) antibodies.

Comparing to the conventional CAR design with fixed antigen CAR (e.g. anti-CD19 CAR), the PEbody CAR design as provided herein, which is a two-component receptor system, allows for targeting different antigens without further genetic manipulations of a patient's immune cells. Because the PEbody CAR can only recognize PE, whereas antibodies targeting antigens can be changed, the PEbody CAR can avoid antigen loss on tumor cells which usually occurs when engineered immune effector cells (e.g., T cells) targeting a single antigen were applied. Moreover, in alternative embodiments, the PEbody CAR system as provided herein has multiple tunable variables to modulate the immune effector cell (e.g., T cell) response such as 1) the affinity between target (e.g., tumor) antigen and antibody, 2) the concentration of the PE-conjugated antibody or PE-conjugated antigen binding molecule, and 3) the expression level of the PEbody CAR on the engineered immune effector cells, e.g., T cell, NK cell, monocyte and/or macrophage. For example, in alternative embodiments, a PE-conjugated antigen (for example, cancer cell antigen or a viral antigen) binding molecule used to practice embodiments (for example, methods) as provided herein comprises: a $F(ab')_2$ (or an Ab digested by pepsin yielding two fragments: a $F(ab')_2$ fragment and a pFc' fragment), a Fab' (a single chain of a $F(ab')_2$ fragment), a single-chain variable fragment (scFv) (or a fusion protein of a variable region of an Ab heavy and light chain connected together with a linker peptide optionally of about ten to about 25 amino acids in length), a $(scFv)_2$, or a di-scFv or a bi-scFv, or a single peptide chain having two variable heavy and two variable light regions yielding tandem scFv, a minibody (or a fusion protein of a variable region of an Ab heavy and light chain connected together with an alkyl group, optionally a methyl or an ethyl group), a diabody (or an scFv with a linker peptide too short (optionally about five amino acids) for the two variable regions to fold together forcing the scFvs to dimerize), a triabody or a tetrabody (or an scFv with a linker peptide too short (optionally about one or two amino acids) for the two variable regions to fold together forcing the scFvs to trimerize or tetramize), a single-domain antibody (dAB) (or a single variable region of an Ab heavy or Ab light chain), a plurality of complementarity determining region (CDR) fragments, or a multispecific antibody formed from two or more antibody fragments.

Compared to other two-component-receptor CARs of which the extracellular receptor is derived from murine scFv (Cho et al., 2018; Ma et al., 2016), in alternative embodiments the extracellular domain of the PEbody CAR is derived from human fibronectin (for example, the PEbody CAR comprises a synthetic binding protein constructed using a human fibronectin type III domain (FN3) as a molecular scaffold), which cannot cause immunogenicity in human body. In alternative embodiments, adaptor molecules as provided herein that connect CAR-expressing immune effector cells, e.g., T cell, NK cell, monocyte and/or macrophage, with tumor or cancer cells for those CARs can comprise PE-conjugated scFv or Fab antigen binding subsequences or PE-conjugated antigen binding fragments of antibodies.

In alternative embodiments, PE-conjugated adaptor molecules as provided herein designed to be bound by the PEbody CAR can be an antibody which has longer half-life in in vivo; this can reduce the frequency of adaptor injection. Also, significantly, PE was reported to be biocompatible, and it has been also used to food color industry (Kubitscheck, 2017). In alternative embodiments, any antibody, e.g., any commercially available antibody, can be conjugated with PE, and this conjugate can be readily used to couple (for example, specifically bind) to the engineered PEbody CAR as provided herein, and thus target different antigens.

In alternative embodiments, exemplary PEbody CAR immune effector cells, e.g., T cell, NK cell, monocyte and/or macrophage can bind to PE-conjugated antibodies recognizing different antigens on cancer cells and hence eradicate different types of tumors without having to re-engineer the immune effector cells, e.g., T cell, NK cell, monocyte and/or macrophage. Engineered immune effector cells, e.g., T cell, NK cell, monocyte and/or macrophage, as provided herein can serve cancer treatment drugs and conveniently switchable to target different tumors combining with antibodies. Combining with different antibodies conjugated to PE, PEbody CAR immune effector cells, e.g., T cell, NK cell, monocyte and/or macrophage, as provided herein can be applied to target drug-resistant cancer cells with evolving antigen profiles. Combining with different antibodies (or any antigen binding molecule) conjugated to PE, PEbody CAR immune effector cells, e.g., T cells, NK cells, monocytes and/or macrophages, as provided herein can be applied to target tumors with heterogenous antigen profiles.

In alternative embodiments, PEbodies to be expressed by immune effector cells, e.g., T cells, NK cells, monocytes and/or macrophages, as provided herein, and/or CAR-T cells as provided herein, or as used in methods as provided herein, including methods for formulating CAR-T cells for administration to or into an individual, or for infusing or administering CAR-expressing immune effector cells, e.g., T cells, NK cells, monocytes and/or macrophages, to an individual, are made or used using any known protocol, for example, as described in U.S. Pat. Nos. 10,696,749; 10,688,166; 10,669,549; 10,588,967; 10,577,407; 10,570,186; 10,550,197 (describing NK cells expressing CARs); U.S. Pat. No. 10,494,422 (describing using CAR-expressing T cells to target and kill HIV infected cells); U.S. Pat. No. 10,471,098 (describing infusing CAR T cells in a hepatic arterial infusion); U.S. Pat. No. 10,457,730 (describing targeting CAR-T cells against B cell malignancies); U.S. Pat. No. 10,316,102 (describing administering CAR-T cells with T cell immune function-enhancing factors); U.S. Pat. Nos. 10,253,086; 10,098,911; 10,478,457; 9,629,877 (describing methods for making CART cells); or U.S. patent application publication nos. 2019 0016820 A1; 2020 0206267 A1 (describing methods of producing "universal" and "off-the-shelf" CAR-T cells); 2020 0199550 A1 (describing a CAR T cell expressing a membrane-tethered signal-dampening component); 2020 0138863 A1 (describing infusing CAR T cells in a hepatic arterial infusion); 2020 0078400 A1 (describing methods of determining dosing of CART cells).

In alternative embodiments, the therapeutic range of CAR-expressing immune effector cells is by based upon the range of peak CD3+ CAR+ T cells, or a CD8+CAR+ T cell subset, in the blood among one or more subjects previously treated with the genetically engineered cells that is associated with an estimated probability of response of greater than or greater than about 65% and an estimated probability of a toxicity of less than or less than about 30%; or peak CD3+CAR+ T cells in the blood, following administration of the genetically engineered cells, that is between or between about 10 cells per microliter and about 500 cells per microliter; or peak CD8+CAR+ T cells in the blood, following administration of the genetically engineered cells, that is between or between about 2 cells per microliter and about 200 cells per microliter, as described for example, in US 2020 0078400 A1.

In alternative embodiments, CAR-expressing immune effector cells, e.g., T cells, NK cells, monocytes and/or macrophages, as provided herein, or as used in methods as provided herein, comprise suicide genes to conditionally destroy them if needed. For example, suicide genes can comprise a Herpes-simplex virus thymidine kinase which renders cells susceptible to ganciclovir; or can comprise an inducible Caspase 9 to make cells susceptible to a small molecular homodimerizer CD20 and RQR8, which renders cells susceptible to rituximab.

In alternative embodiments, nucleic acids encoding the protein components of PEbodies to be expressed by immune effector cells, e.g., T cells, NK cells, monocytes and/or macrophages, as provided herein are inserted and expressed intracellularly using any expression vehicle, for example, using a vector such as a viral vector, such as a retroviral vector or a lentiviral vector, a plasmid, or a transposon based vector or synthetic nucleic acid such as a synthetic mRNA.

Products of Manufacture and Kits

Provided are products of manufacture and kits comprising genetically engineered PEbody CAR-expressing immune effector cells, e.g., T cells, NK cells, monocytes and/or macrophages, and optionally also comprising an antibody or antibodies conjugated to PE, wherein optionally the antibody or antibodies are capable of targeting and binding to a specific cell, for example, a specific cancer or tumor cell; and the kit also optionally comprising instructions for practicing methods as provided herein.

Any of the above aspects and embodiments can be combined with any other aspect or embodiment as disclosed here in the Summary, Figures and/or Detailed Description sections.

As used in this specification and the claims, the singular forms "a," "an" and "the" include plural referents unless the context clearly dictates otherwise.

Unless specifically stated or obvious from context, as used herein, the term "or" is understood to be inclusive and covers both "or" and "and".

Unless specifically stated or obvious from context, as used herein, the term "about" is understood as within a range of normal tolerance in the art, for example within 2 standard deviations of the mean. About (use of the term "about") can be understood as within 20%, 19%, 18%, 17%, 16%, 15%, 14%, 13%, 12% 11%, 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless specifically stated or obvious from context, as used herein, the terms "substantially all", "substantially most of", "substantially all of" or "majority of" encompass at least about 90%, 95%, 97%, 98%, 99% or 99.5%, or more of a referenced amount of a composition.

The entirety of each patent, patent application, publication and document referenced herein hereby is incorporated by reference. Citation of the above patents, patent applications, publications and documents is not an admission that any of the foregoing is pertinent prior art, nor does it constitute any admission as to the contents or date of these publications or documents. Incorporation by reference of these documents, standing alone, should not be construed as an assertion or admission that any portion of the contents of any document is considered to be essential material for satisfying any national or regional statutory disclosure requirement for patent applications. Notwithstanding, the right is reserved for relying upon any of such documents, where appropriate, for providing material deemed essential to the claimed subject matter by an examining authority or court.

Modifications may be made to the foregoing without departing from the basic aspects of the invention. Although the invention has been described in substantial detail with reference to one or more specific embodiments, those of ordinary skill in the art will recognize that changes may be made to the embodiments specifically disclosed in this application, and yet these modifications and improvements are within the scope and spirit of the invention. The invention illustratively described herein suitably may be practiced in the absence of any element(s) not specifically disclosed herein. Thus, for example, in each instance herein any of the terms "comprising", "consisting essentially of", and "consisting of" may be replaced with either of the other two terms. Thus, the terms and expressions which have been employed are used as terms of description and not of limitation, equivalents of the features shown and described, or portions thereof, are not excluded, and it is recognized that various modifications are possible within the scope of the invention. Embodiments of the invention are set forth in the following claims.

The invention will be further described with reference to the examples described herein; however, it is to be understood that the invention is not limited to such examples.

EXAMPLES

Unless stated otherwise in the Examples, all recombinant DNA techniques are carried out according to standard protocols, for example, as described in Sambrook et al. (1989) Molecular Cloning: A Laboratory Manual, Second Edition, Cold Spring Harbor Laboratory Press, NY and in Volumes 1 and 2 of Ausubel et al. (1994) Current Protocols in Molecular Biology, Current Protocols, USA. Other references for standard molecular biology techniques include Sambrook and Russell (2001) Molecular Cloning: A Laboratory Manual, Third Edition, Cold Spring Harbor Laboratory Press, NY, Volumes I and II of Brown (1998) Molecular Biology LabFax, Second Edition, Academic Press (UK). Standard materials and methods for polymerase chain reactions can be found in Dieffenbach and Dveksler (1995) PCR Primer: A Laboratory Manual, Cold Spring Harbor Laboratory Press, and in McPherson at al. (2000) PCR—Basics: From Background to Bench, First Edition, Springer Verlag, Germany.

Example 1: Making and Using PEbody CAR T Cell Systems

This example demonstrates that methods and compositions as provided herein, including the PEbody CAR T Cell Systems as provided herein, are effective and can be used to target and destroy a target cell such as a cancer cell in vivo.

Directed Evolution of a PE Binder (PEbody)

Figure 1:
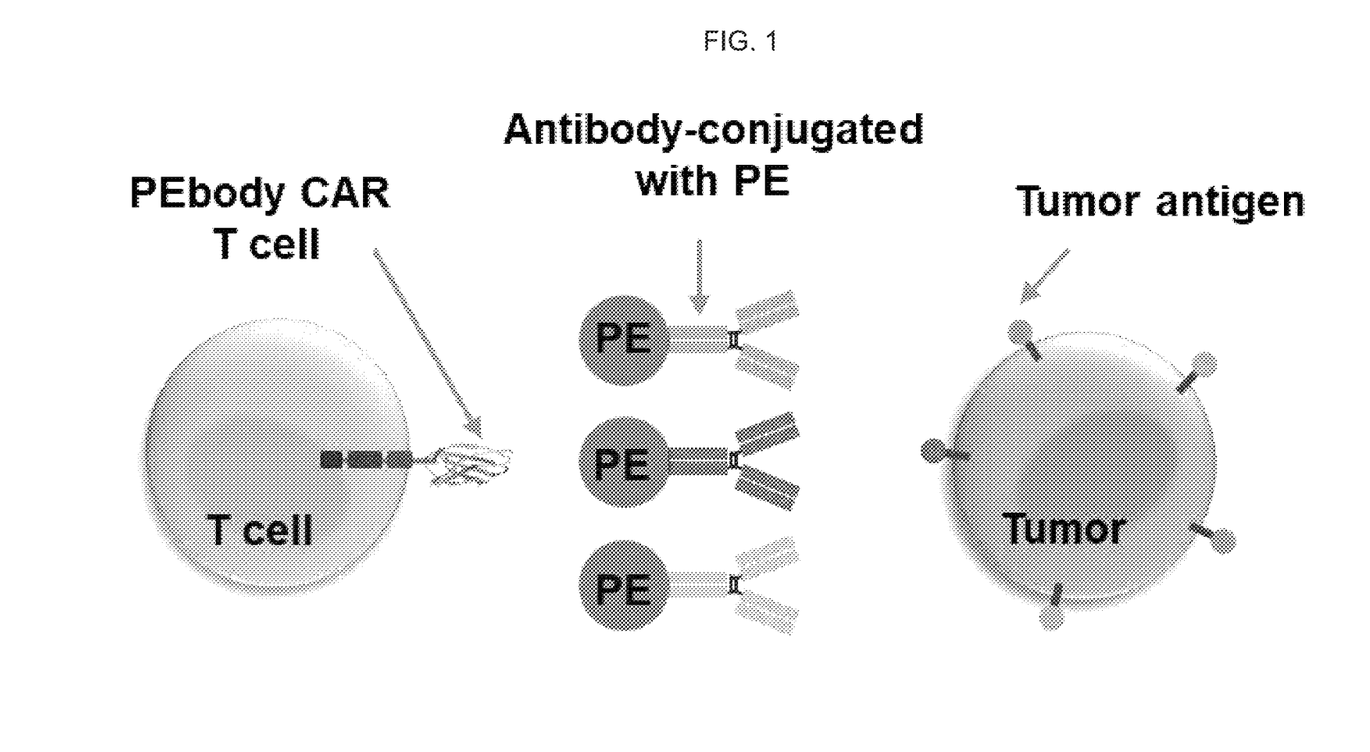
FIG. 1 illustrate a schematic diagram showing the mechanism of an PEbody CAR T cell as provided herein directing (or targeting) a tumor cell; the PEbody on the extracellular domain of the PEbody-comprising CAR T cell binds to a PE-conjugated antibody, which then selectively targets and binds to the antigen to which the antibody is designed to specifically bind to on the surface of a target cell, e.g., a cancer cell.
Figure 2A:
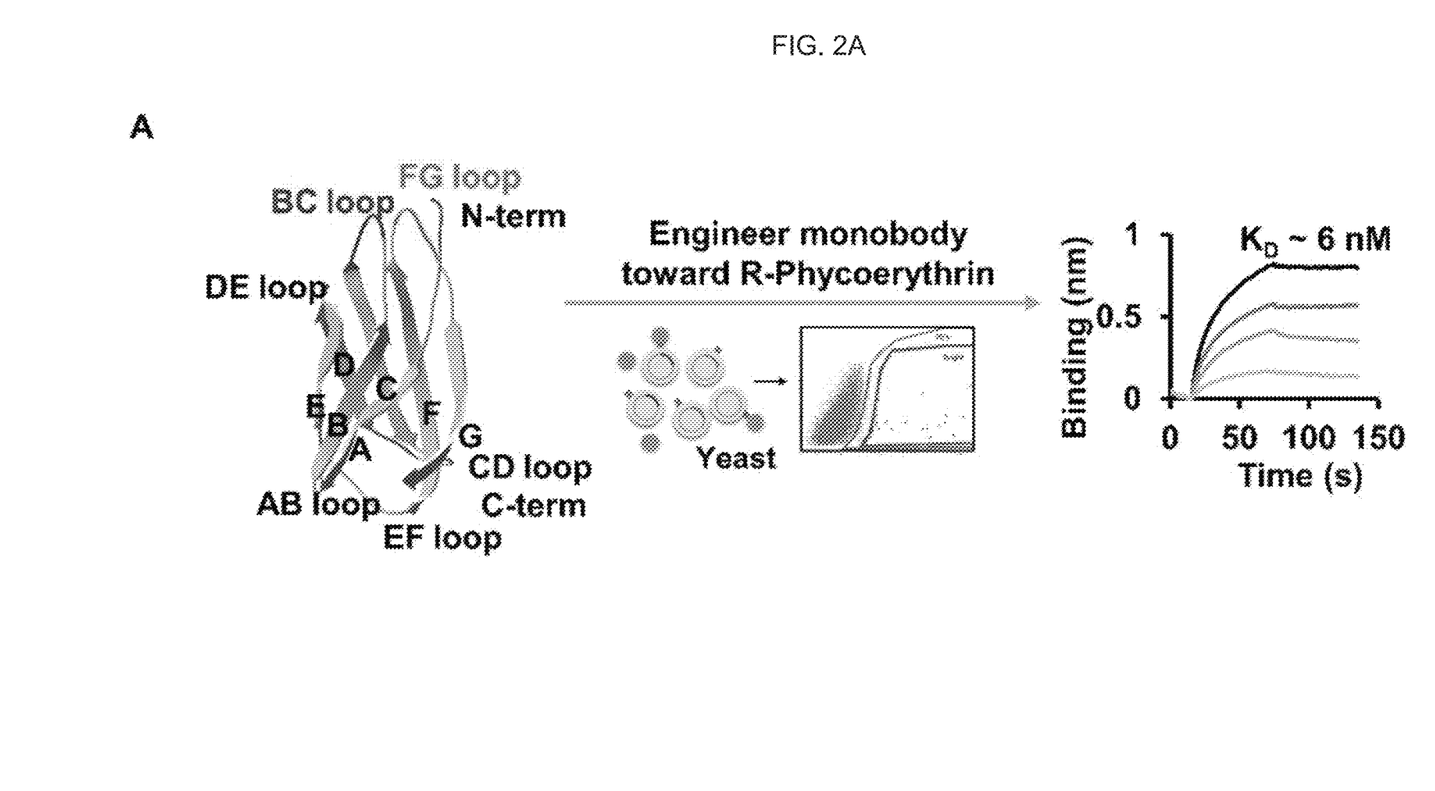
FIG. 2A illustrates a schematic diagram showing directed evolution of the PE-binding monobody (PEbody); Left image illustrates the structure of the G9 monobody (modified from PDB ID: 1TTG); Middle image illustrates the G9 monobody was used as a template for directed evolution to evolve to a PE binder; the amino acids in the BC and FG loops were mutated; these monobody variants were then introduced into yeast; after induction, protein variants were expressed on yeast surface and screened against PE dye; only cells with high intensity of PE were selected and sequenced; Right image graphically illustrates the determination of the dissociation constant between PE and the PEbody by bio-layer interferometry.

The G9 monobody, initially engineered to bind to the Src Homology 3 (SH3) of Fyn (Huang et al., 2012), was used as a template to generate the library of variants followed by screening against R-Phycoerythrin (PE) (FIG. 2) (Limsakul et al., 2018). After several rounds of screening by fluorescence-activated cell sorting (FACS) and sequence-function analysis, we obtained a variant, named PEbody, which binds to PE with high affinity ($K_D$=5.7±3.5 nM) (FIG. 2A). The PEbody can be displayed at the surface of yeast or mammalian cell (e.g. human embryonic kidney cells, HEK293) and the PE staining results show that PE specifically binds to the surface of cells expressing the PEbody, but not for those expressing the G9 monobody (FIG. 2C, Right).

Design and Characterization of the PEbody CAR System

Figure 3A:
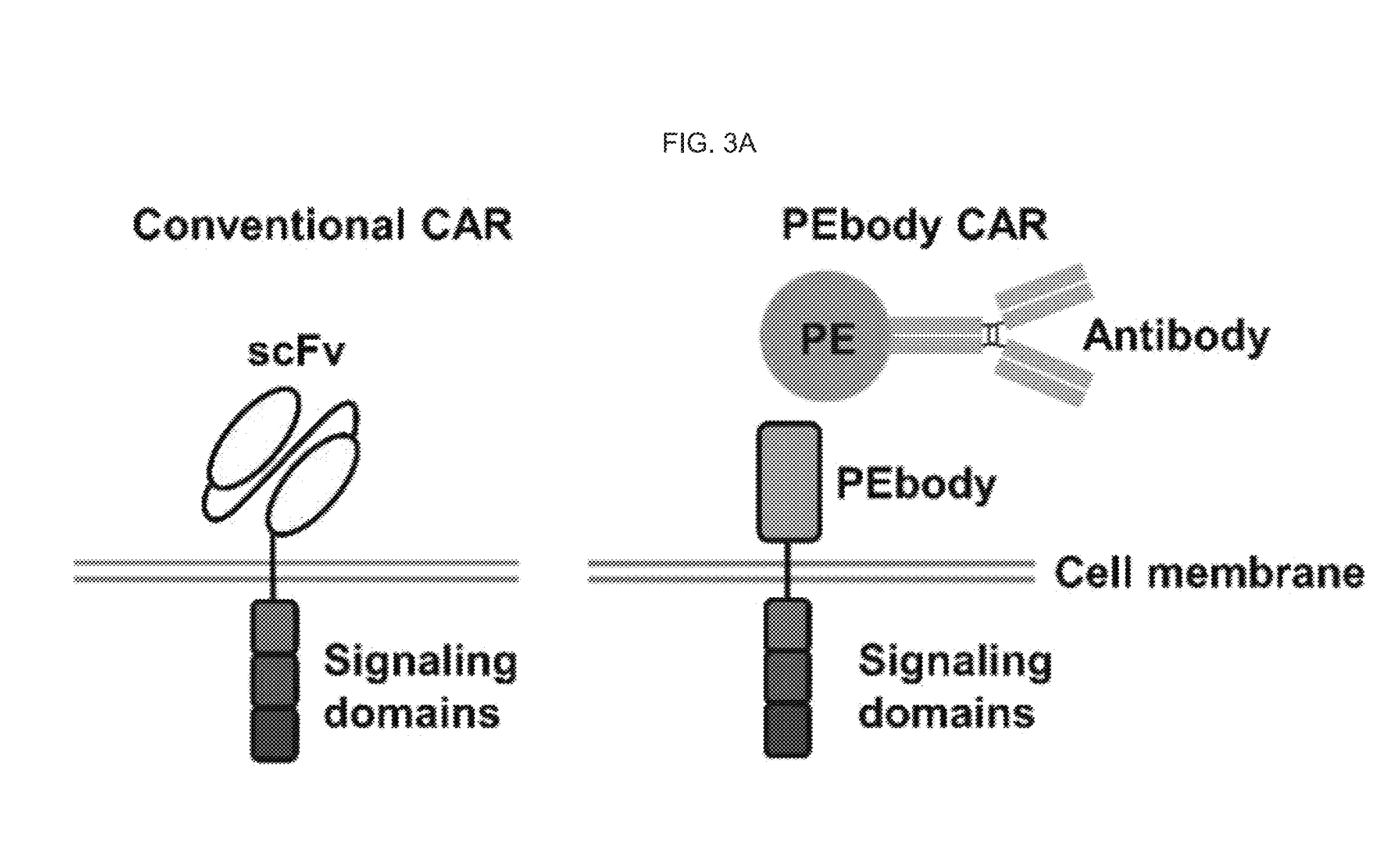
FIG. 3A schematically illustrates a comparison between the conventional CAR and the exemplary PEbody CAR design. The conventional CAR structure includes an extracellular antigen recognition domain (e.g. scFv) fused to intracellular TCR signaling domains and co-stimulatory domains. While the intracellular of the PEbody CAR system is similar to the conventional CAR, the extracellular recognition domain is composed of two components: the PEbody and a PE-conjugated antibody.
Figure 3B:
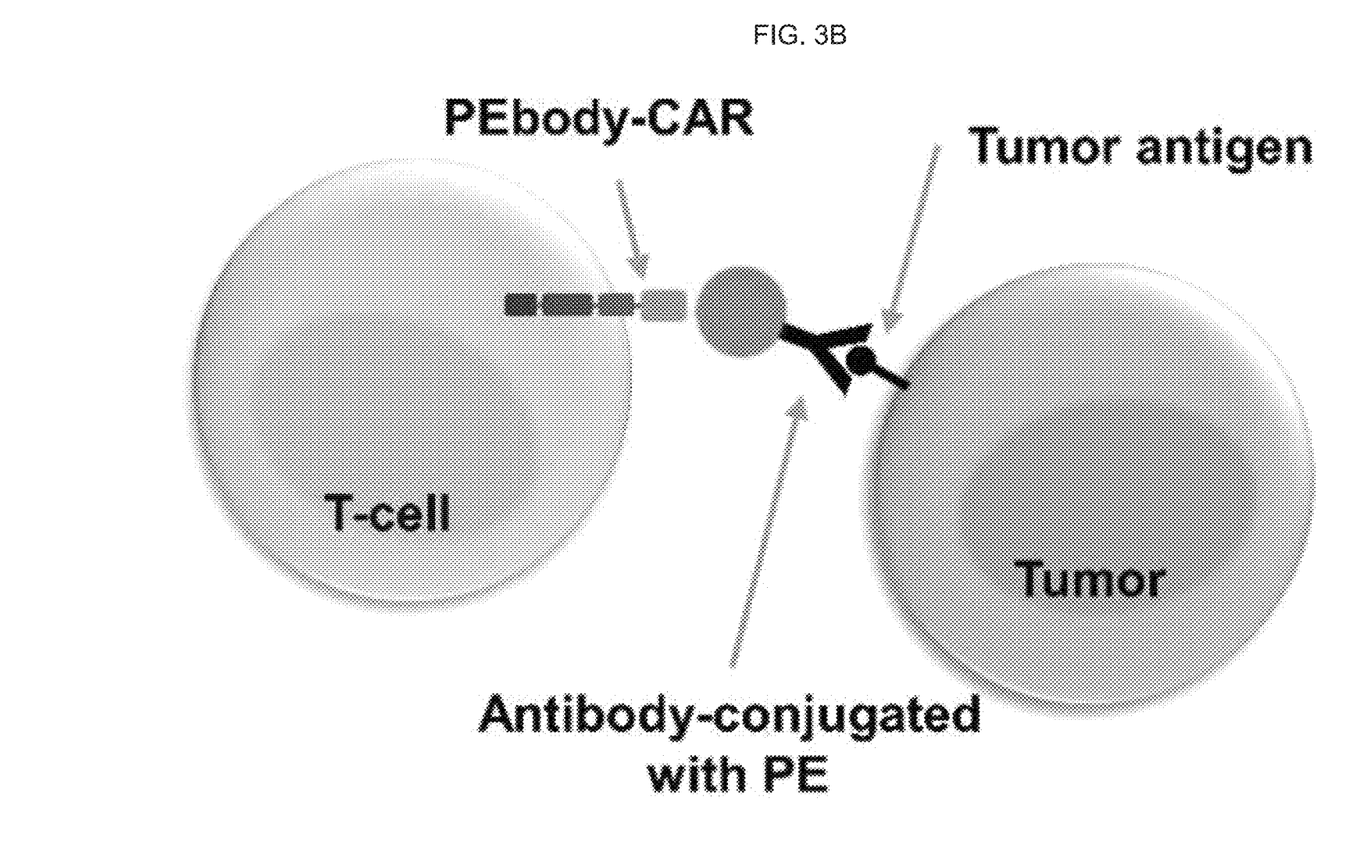
FIG. 3B schematically illustrates a diagram of how PEbody CAR T cell targets tumor cells. The PEbody binds to the PE-conjugated antibody which targets specific antigen on the surface of tumor cells.

The PEbody was inserted into an extracellular domain of the $3^{rd}$ generation CAR of which intracellular domains contain CD28, 4-1BB co-stimulatory and a CD3ζ signaling domain. The PEbody CAR is a two-component system containing the PE-targeting receptor (PEbody) expressed on T cells and a tumor-targeting antibody conjugated with PE (FIGS. 3.1A-B). The functional CAR is reconstituted when the PE-conjugated antibody is added to engineered T cells that express PEbody CARs.

Figure 2B:
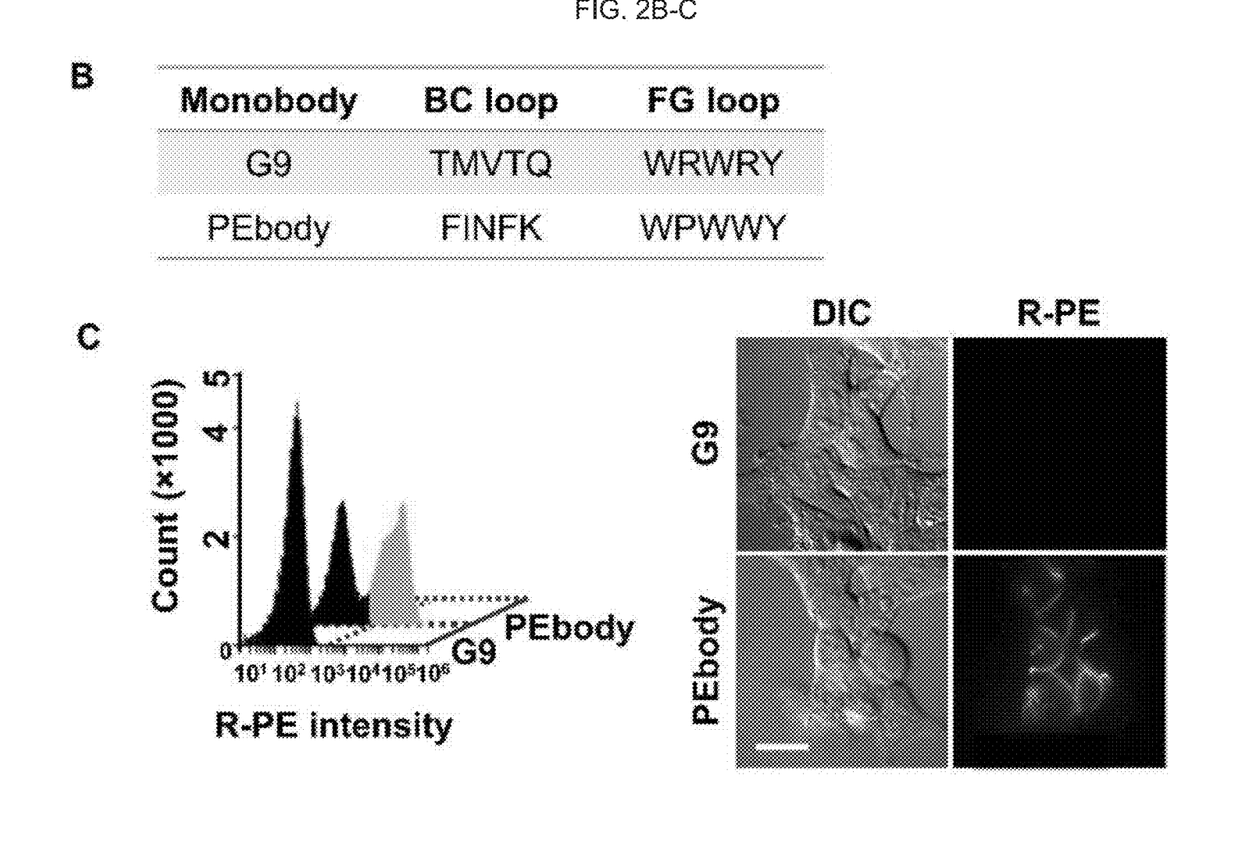
FIG. 2B illustrates amino acid sequences in the BC and FG loops of the G9 and PEbody: TMVTQ (SEQ ID NO:1); WRWRY (SEQ ID NO:2); FINFK (SEQ ID NO:3); WPWWY (SEQ ID NO:4)
Figure 3C:
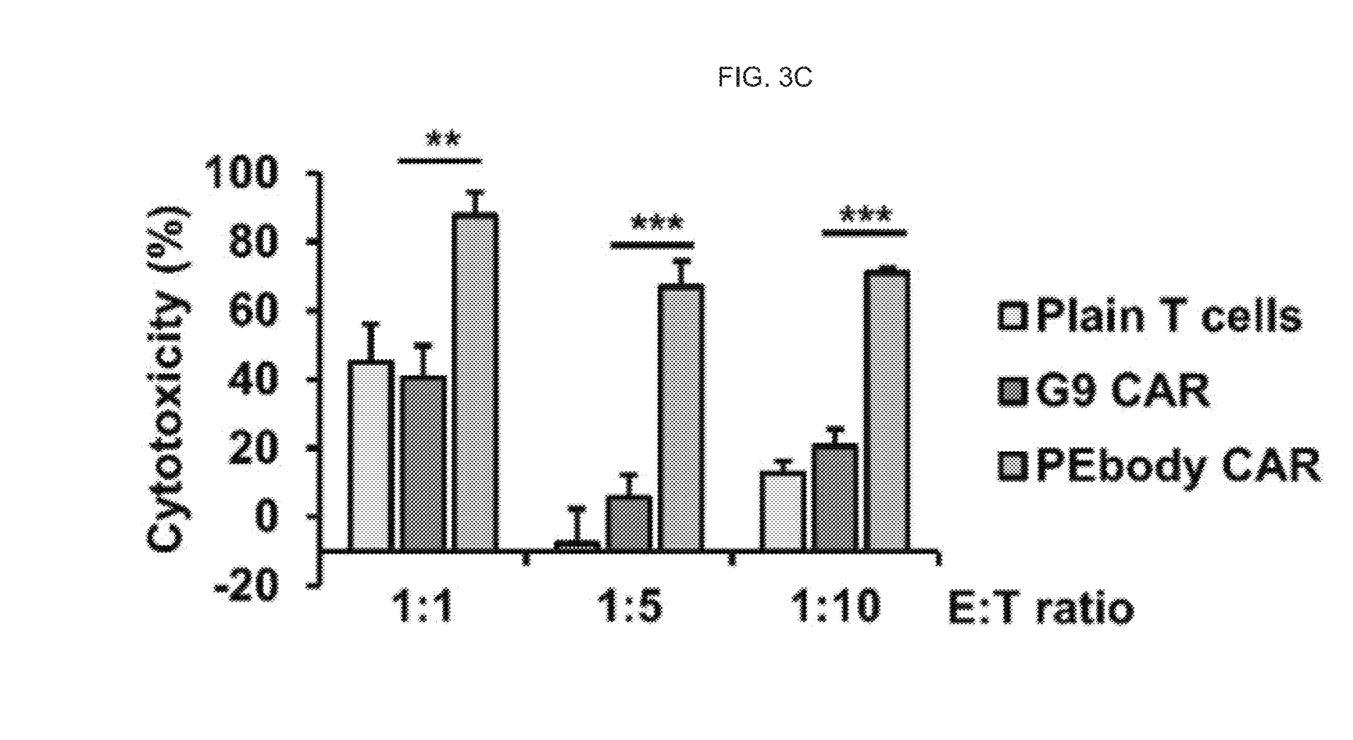
FIG. 3C graphically illustrates data showing that the exemplary PEbody CAR specifically targets the PE-conjugated anti-CD19 antibody on tumor cell surface. Human primary T cells without (Plain) and with CAR constructs (G9 CAR or PEbody CAR) were co-cultured in vitro with NALM6 cancer cells which were prior stained with the anti-CD19 antibody conjugated with PE. The luciferase signal for cytotoxicity calculation was measured by a plate reader. Data in (C) are represented as mean±SD (n=4). The asterisk indicates a significant difference (p<0.01, *p<0.001; t-test)

The PEbody has been examined to be specific binding to PE in yeast and mammalian cell systems (FIG. 2). To test specificity of the PEbody in the CAR system, we engineered human primary T cells to express the PEbody CAR or the G9 CAR. The G9 monobody, which has a similar structure as the PEbody but cannot bind to PE (FIG. 2C), was cloned to replace the extracellular portion of CAR. The PEbody CAR or the G9 CAR lentiviral particles were then generated and infected to T cells (purified from the same donor). CAR T cells were further enriched by magnetic-activated cell sorting (MACS) before co-culturing with cancer cells. T cells expressing these CAR constructs were co-cultured with NALM6 (a B cell precursor leukemia cell line), which was stained with the PE-conjugated anti-CD19 antibody. NALM6 cells were genetically encoded with firefly luciferase for the luciferase killing assay. We varied E:T ratio between CAR T cells (E, effector) and tumor cells (T, target) to validate the killing ability of CAR T cells by measuring the luciferase signal of remaining NALM6 cells. Our result shows that the PEbody CAR T cells selectively target the PE-conjugated antibody but not for the G9 CAR and plain T cells (FIG. 3.1C).

In Vitro Comparison of Anti-CD19 CAR Vs. PEbody CAR T Cells

Figure 4:
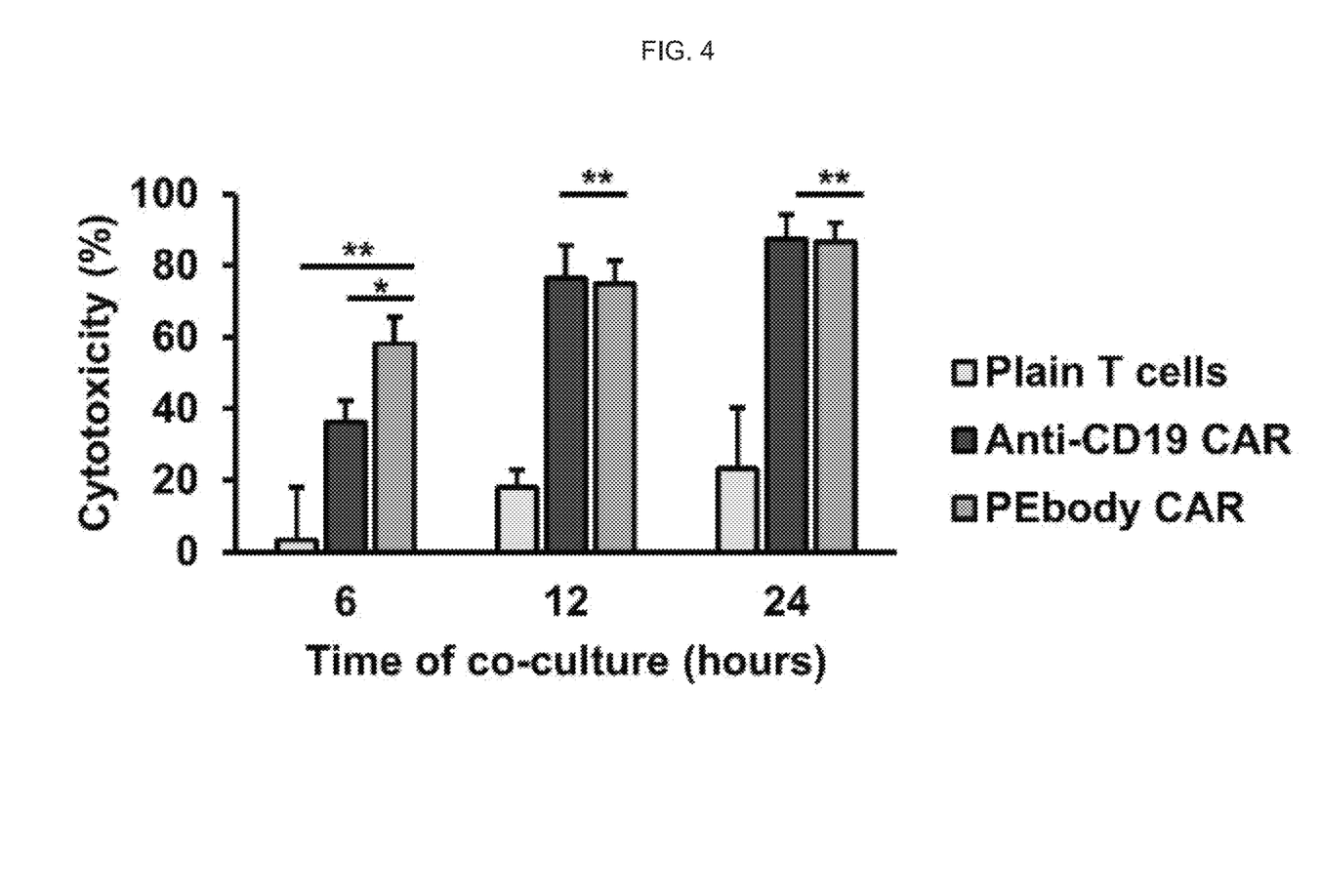
FIG. 4 graphically illustrates data showing the comparison of cytotoxicity between the anti-CD19 CAR and the exemplary PEbody CAR: human primary T cells without (Plain) and with anti-CD19 CAR constructs were co-cultured in vitro with NALM6 cells for 6, 12, and 24 hours (h); in addition, T cells expressing the exemplary PEbody CAR were also co-cultured with NALM6 (stained with the PE-conjugated anti-CD19 antibody) for 6, 12, and 24 hours (h); after co-culturing, cells were harvested for the luciferase-based killing assay; data are represented as mean±SD (n=4); the asterisk indicates a significant difference (*p<0.05, **p<0.01; t-test); as described in detail in Example 1, below.

To determine the activity of the PEbody CAR T cells, we compared the killing ability of the PEbody CAR with the anti-CD19 CAR in the presence of NALM6 cells. The PEbody CAR or anti-CD19 CAR lentiviral particles were generated and used to transduced T cells (purified from the same donor). CAR T cells were further enriched by MACS before co-culturing with cancer cells. For the PEbody CAR, we firstly stained NALM6 cells with the PE-conjugated anti-CD19 antibody and co-cultured them with PEbody CAR T cells. For anti-CD19 CAR, CAR T cells were directly co-cultured with NALM6 cells without any staining. The results from the luciferase-based killing assay illustrate that the PEbody CAR T cells can kill NALM6 cells to a similar extent as anti-CD19 CART cells in 12 h and 24 h of co-culturing (FIG. 4).

Overall, our in vitro findings demonstrate that the function and activity of PEbody CAR T cells are comparable to conventional anti-CD19 CAR T cells.

The PEbody CAR System Targeting Different Tumor Antigens

In contrast to the conventional fixed CAR design, the PEbody CAR design allows for targeting of different antigens without further genetic manipulations of a patient's immune cells. To test the versatile ability of the PEbody CAR system in targeting different antigens, we introduced the PEbody CARs into human primary T cells and co-cultured them in vitro with either hematologic cancer cell lines, e.g., NALM6 leukemia cells that express CD19, CD20, and CD38, or solid cancer cell lines, e.g., MCF-7, MDA-MB-231, and PC-3 that express HER2, MUC1, and PSMA tumor antigens, respectively.

Figure 5:
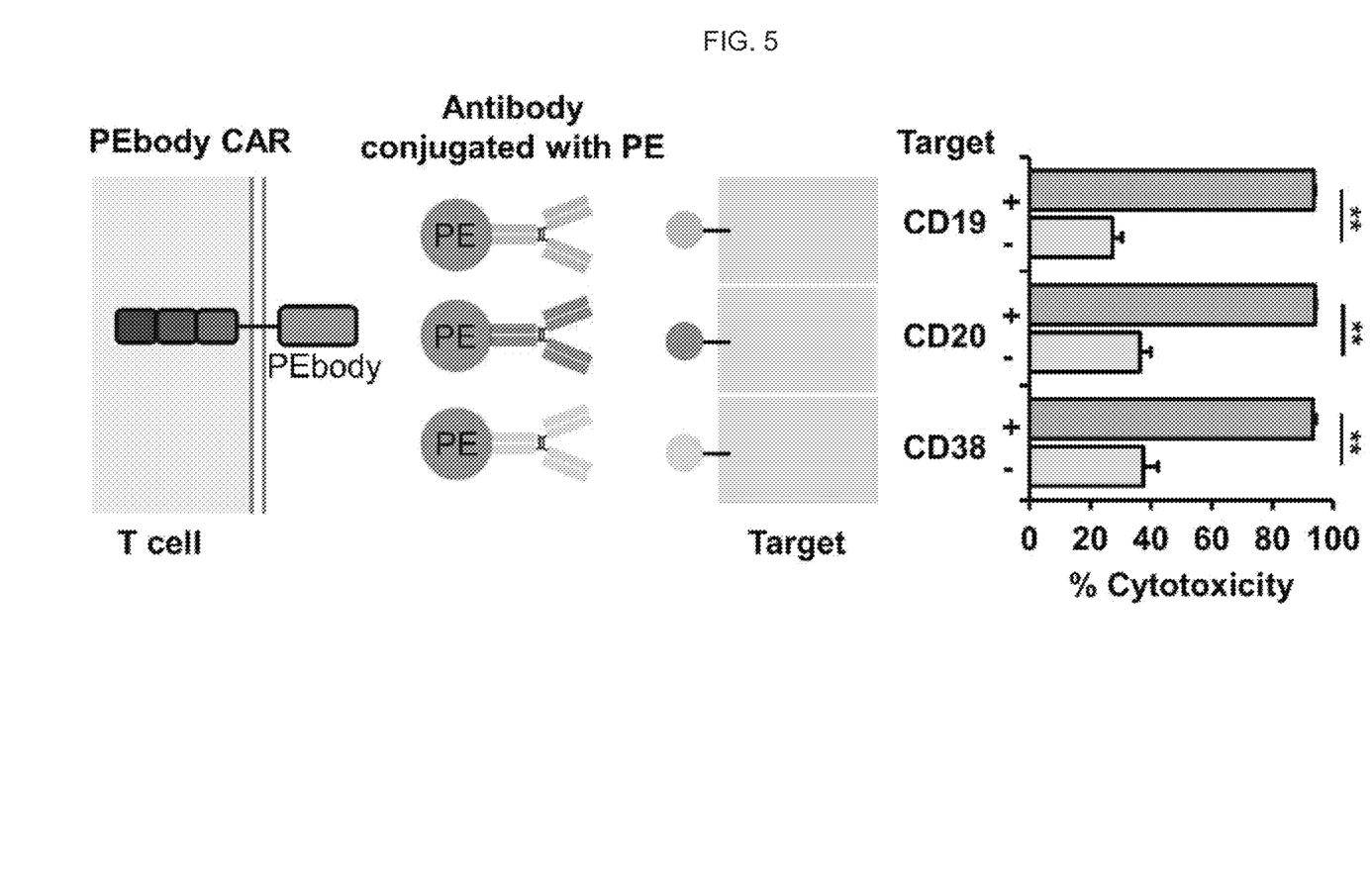
FIG. 5 schematically illustrates a diagram showing the exemplary PEbody CAR system targeting different antigens on hematologic cancers: different PE-conjugated antibodies such as anti-CD19, CD20, and CD38 antibodies were used to stain NALM6 cells. PEbody CAR T cells recognized PE and its conjugated antibodies on the surface of tumor cells and killed the cells; the luciferase signal of remaining cells was measured for cytotoxicity calculation. % of cytotoxicity of PEbody CAR T cells in the presence of PE-conjugated antibodies (+) is significantly higher than those in the absence of PE-conjugated antibodies (−); data are represented as mean±SD (n=4); the asterisk indicates a significant difference (*p<0.05, **p<0.01; t-test); as described in detail in Example 1, below.
Figure 6A:
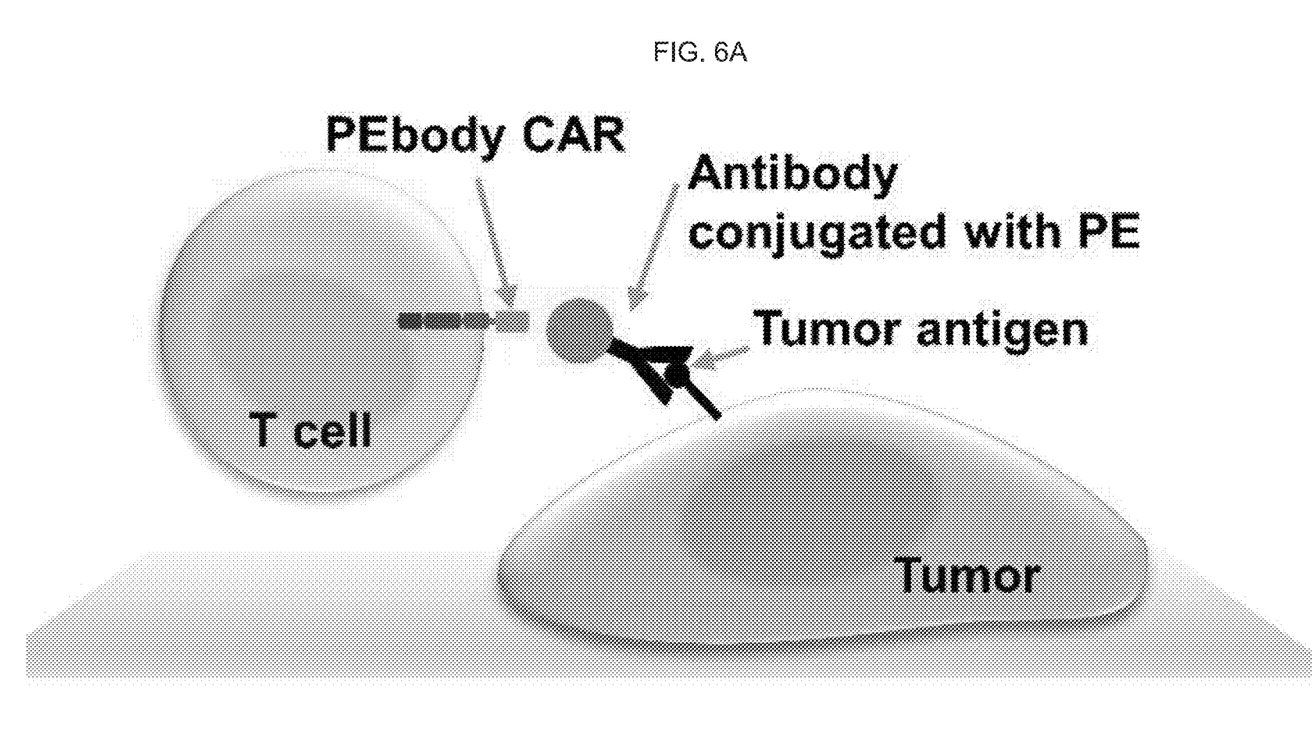
FIG. 6A schematically illustrates a diagram showing exemplary PEbody CAR T cells directing tumor cells. The PEbody CAR has the PEbody as the extracellular domain of the CAR which binds to a PE-conjugated antibody, while the antibody targets specific antigen on the surface of solid tumor cells.
Figure 6B:
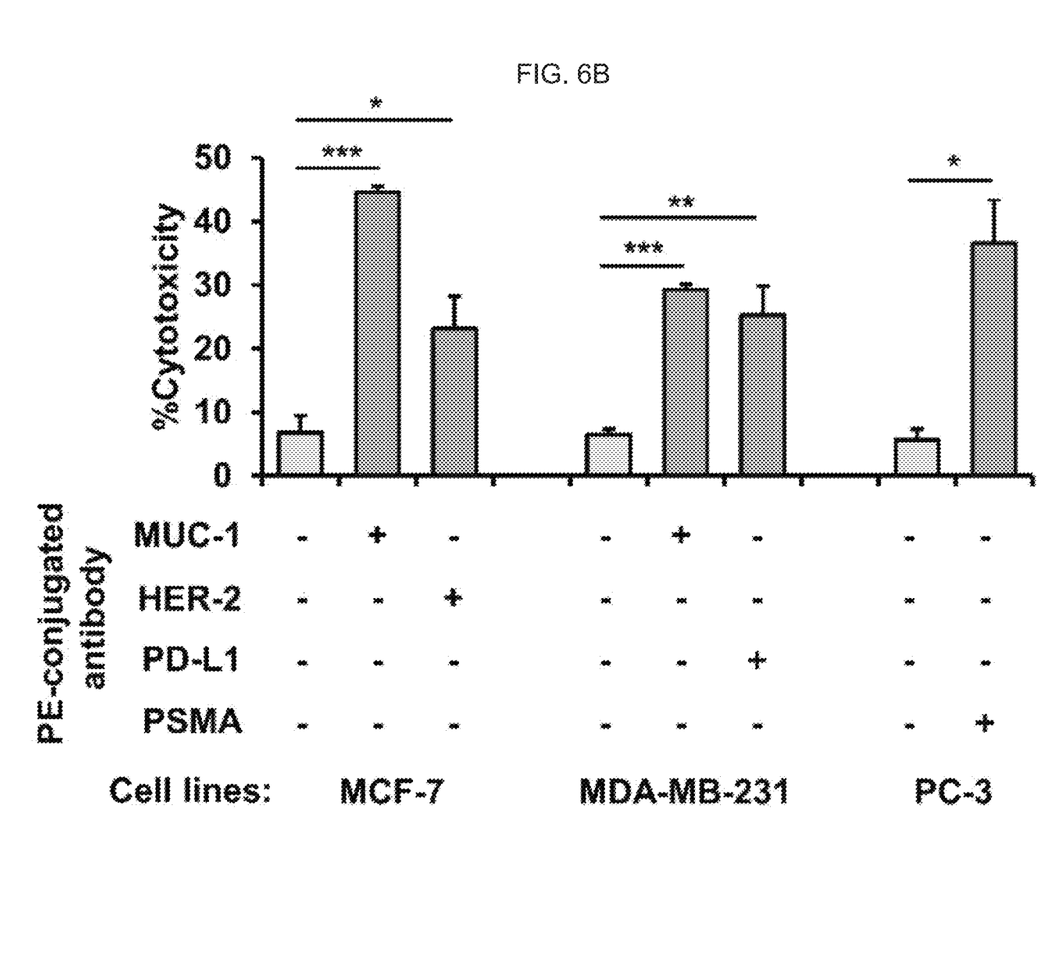
FIG. 6B graphically illustrates data showing the killing efficiency of PEbody CAR T cells on different solid cancer cell lines such as breast cancer cell lines, e.g. MCF-7 and MDA-MB-23, and the prostate cancer cell line, e.g. PC-3; different PE-conjugated antibodies, including (1) anti-MUC-1 or anti-HER-2 for MCF-7, (2) anti-MUC-1 or anti-PD-L1 for MDA-MB-231, and (3) anti-PSMA for PC-3, were added to PEbody CAR T cells co-cultured with different cancer cell lines; the (+) sign indicates the addition of the PE-conjugated antibody; the (−) sign indicates the absence of the PE-conjugated antibody; the killing efficiency was calculated as % of cytotoxicity; data in (FIG. 6B) are represented as mean±SD (n=3); the asterisk indicates a significant difference (*p<0.05, p<0.01, *p<0.001; t-test)

For hematologic cancers, multiple antibodies (conjugated with PE) including anti-CD19, anti-CD20, and anti-CD38 were used to target NALM6 cells. After staining, the unbounded antibodies were washed away and stained NALM6 cells were co-cultured with the PEbody CAR T cells. The results consistently show that the PEbody CAR T cells kill the corresponding tumor cells when the appropriate PE-conjugated antibody binds to tumor antigens whereas only minor killing ability was observed in non-stained NALM6 cells (FIG. 5). In addition to hematologic cancers, similar experiments have been conducted for solid cancer cells (FIG. 6). Different cancer cell lines were co-cultured, in the presence of appropriate antibodies, with PEbody CAR T cells such as the breast cancer cell lines, e.g. MCF-7 and MDA-MB-231, and the prostate cancer cell line, e.g. PC-3. Each cell line endogenously expresses multiple antigens such as 1) MCF-7 express Mucin-1 (MUC-1) and human epidermal growth factor receptor 2 (HER-2); 2) MDA-MB-231 express MUC-1 and programmed death-ligand 1 (PD-L1). However, PC-3 cells were over expressed the prostate-specific membrane antigen (PSMA) on the cell surface. All cancer cell lines were also introduced with genetically encoded firefly luciferase for the luciferase killing assay. To verify the killing ability of PEbody CAR system to target different antigens on the solid cancers, PEbody CAR T cells were co-cultured with different cancer cells in the presence and absence of appropriate PE-conjugated antibodies (FIG. 6B). The results show that the killing efficiency of PEbody CAR T cells in the presence of PE-conjugated antibodies is significantly better than those in the absence of PE-conjugated antibodies. This indicates that PE-conjugated antibodies are selective to the PEbody CAR and can mediate the killing ability of PEbody CAR T cells.

Figure 7A:
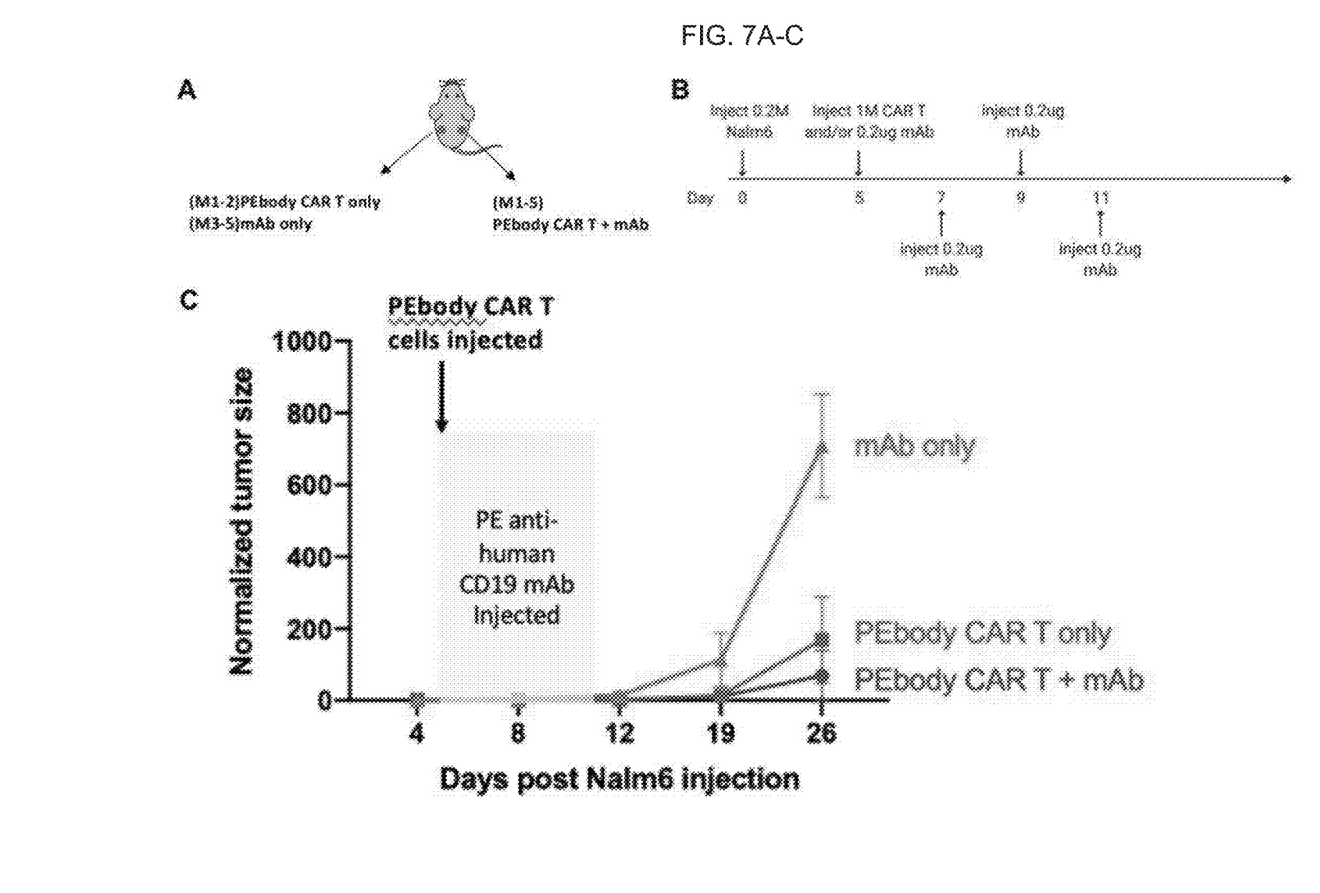
FIG. 7A schematically illustrates the experimental protocol where primary human T cells expressing exemplary PEbody CAR cells were subcutaneously injected with or without the accompanied 0.2 ug PE-conjugated human anti-CD19 antibody.

PEbody CAR T Cells can be Guided by PE-Conjugated Antibodies Recognizing Tumor Associated Antigens (TAAs) to Suppress Tumor Growth In Vivo We have conducted in vivo experiments employing exemplary PEbody CAR T cells for the tumor suppression in xenograft mouse models. 0.2 million Nalm6 tumor cells expressing the tumor associated antigen (TAA) CD19 were injected subcutaneously on two sides of the immune-deficient NSG mice. At day 5, primary human T cells expressing PEbody CAR were subcutaneously injected with or without the accompanied 0.2 ug PE-conjugated human anti-CD19 antibody (Biolegend #302254) (FIG. 7A). The antibody continued to be dosed every 2 days at 0.2 ug for 6 days to keep the engineered T cells and tumors engaged (FIG. 7B). The tumor burden was measured as the total flux (photon/s) from the luciferase activity of each mouse using IVIS imaging and normalized by the tumor burden on day 4 (one day before PEbody CAR injection).

The results showed that the exemplary PEbody CAR T cells as provided herein can suppress the target tumor growth, guided by the PE-conjugated antibody recognizing CD19 (FIG. 7C). These results provide the proof-of-concept that the universal PEbody CAR T cells as provided herein can be applied for cancer immunotherapy in vivo, potentially against different target tumor types aided by the PE-conjugated antibodies recognizing TAAs.

REFERENCES

Cho, J. H., et al., (2018). Universal chimeric antigen receptors for multiplexed and logical control of T cell responses. Cell 173, 1426-1438. e1411.

Huang, R., et al., (2012). Isolation of monobodies that bind specifically to the SH3 domain of the Fyn tyrosine protein kinase. New biotechnology 29, 526-533.

Kubitscheck, U. (2017). Fluorescence microscopy: from principles to biological applications (John Wiley & Sons).

Limsakul, P., et al., (2018). Directed Evolution to Engineer Monobody for FRET Biosensor Assembly and Imaging at Live-Cell Surface. Cell chemical biology 25, 370-379. e374.

Ma, J. S., Kim, et al., (2016). Versatile strategy for controlling the specificity and activity of engineered T cells. Proceedings of the National Academy of Sciences 113, E450-E458.

A number of embodiments of the invention have been described. Nevertheless, it can be understood that various modifications may be made without departing from the spirit and scope of the invention. Accordingly, other embodiments are within the scope of the following claims.

What is claimed is:

1. A genetically engineered immune effector cell comprising a cell surface expressed: phycoerythrin-targeting heterologous antibody or monobody; or, R-Phycoerythrin-targeting (PE-targeting) receptor (PEbody),
   wherein the phycoerythrin-targeting heterologous antibody or monobody, and the R-Phycoerythrin-targeting (PE-targeting) receptor (PEbody), are capable of specifically binding to a R-Phycoerythrin,
   wherein the phycoerythrin or R-Phycoerythrin is conjugated to an antigen binding molecule,
   wherein the R-Phycoerythrin-targeting (PE-targeting) receptor (PEbody) has an amino acid sequence comprising:

```
                                            (SEQ ID NO: 5)
AVSDVPRKLEVVAATPTSLLISWDAPFINFKYYRITYGETGGNSPVQEF
TVPGSKSTATISGLKPGVDYTITVYAVTWPVVWYSKPISINYRTS.
```

2. The genetically engineered immune effector cell of claim 1, wherein the target-targeting R-Phycoerythrin-conjugated (PE-conjugated) antibody or monobody, or the PE conjugated antigen binding molecule, is capable of targeting and binding to a cancer or tumor antigen or a cancer or tumor cell.

3. A kit comprising a genetically engineered immune effector cell of claim 1.

4. A kit comprising: a genetically engineered immune effector cell of claim 1, and a target-targeting R-Phycoerythrin-conjugated (PE-conjugated) antibody or monobody or PE-conjugated antigen binding molecule,
   wherein the R-Phycoerythrin-targeting (PE-targeting) receptor (PEbody) has an amino acid sequence comprising SEQ ID NO:5.

5. The genetically engineered immune effector cell of claim 1, wherein the genetically engineered immune effector cell is a Chimeric Antigen Receptor (CAR)-expressing T cell, a progenitor T cell a Natural Killer (NK) cell, a monocyte and/or a macrophage.

6. The genetically engineered immune effector cell of claim 1, wherein the genetically engineered immune effector cell is a human cell.

7. The genetically engineered immune effector cell of claim 6, wherein the human cell is a human T cell, a human progenitor T cell, a human NK cell, a human monocyte and/or a human macrophage.

8. The genetically engineered immune effector cell of claim 1, wherein the R-Phycoerythrin-targeting (PE-targeting) receptor (PEbody) has an amino acid sequence consisting of:

```
                                            (SEQ ID NO: 5)
AVSDVPRKLEVVAATPTSLLISWDAPFINFKYYRITYGETGGNSPVQEF
TVPGSKSTATISGLKPGVDYTITVYAVTWPVVWYSKPISINYRTS.
```

9. The genetically engineered immune effector cell of claim 1, wherein the antigen is cancer or a tumor antigen, or a viral antigen.

10. The kit of claim 4, where the R-Phycoerythrin-targeting (PE-targeting) receptor (PEbody) has an amino acid sequence consisting of SEQ ID NO: 5.

* * * * *

SEQUENCE LISTING

```
<160> NUMBER OF SEQ ID NOS: 5

<210> SEQ ID NO 1
<211> LENGTH: 5
<212> TYPE: PRT
<213> ORGANISM: artificial sequence
<220> FEATURE:
<223> OTHER INFORMATION: synthetic peptide

<400> SEQUENCE: 1

Thr Met Val Thr Gln
1               5

<210> SEQ ID NO 2
<211> LENGTH: 5
<212> TYPE: PRT
<213> ORGANISM: artificial sequence
<220> FEATURE:
<223> OTHER INFORMATION: synthetic peptide

<400> SEQUENCE: 2

Trp Arg Trp Arg Tyr
1               5

<210> SEQ ID NO 3
<211> LENGTH: 5
<212> TYPE: PRT
<213> ORGANISM: artificial sequence
<220> FEATURE:
<223> OTHER INFORMATION: synthetic peptide

<400> SEQUENCE: 3

Phe Ile Asn Phe Lys
1               5

<210> SEQ ID NO 4
<211> LENGTH: 5
<212> TYPE: PRT
<213> ORGANISM: artificial sequence
<220> FEATURE:
<223> OTHER INFORMATION: synthetic peptide

<400> SEQUENCE: 4

Trp Pro Trp Trp Tyr
1               5

<210> SEQ ID NO 5
<211> LENGTH: 93
<212> TYPE: PRT
<213> ORGANISM: artificial sequence
<220> FEATURE:
<223> OTHER INFORMATION: synthetic peptide

<400> SEQUENCE: 5

Ala Val Ser Asp Val Pro Arg Lys Leu Glu Val Val Ala Ala Thr Pro
1               5                   10                  15
```

```
Thr Ser Leu Leu Ile Ser Trp Asp Ala Pro Phe Ile Asn Phe Lys Tyr
        20              25                  30

Tyr Arg Ile Thr Tyr Gly Glu Thr Gly Gly Asn Ser Pro Val Gln Glu
        35              40                  45

Phe Thr Val Pro Gly Ser Lys Ser Thr Ala Thr Ile Ser Gly Leu Lys
        50              55              60

Pro Gly Val Asp Tyr Thr Ile Thr Val Tyr Ala Val Thr Trp Pro Trp
65              70              75              80

Trp Tyr Ser Lys Pro Ile Ser Ile Asn Tyr Arg Thr Ser
                85              90
```